May 9, 1944. C. A. HILLMAN 2,348,624
PROCESS OF CATALYTIC REFORMING
Filed Dec. 30, 1939 2 Sheets-Sheet 1

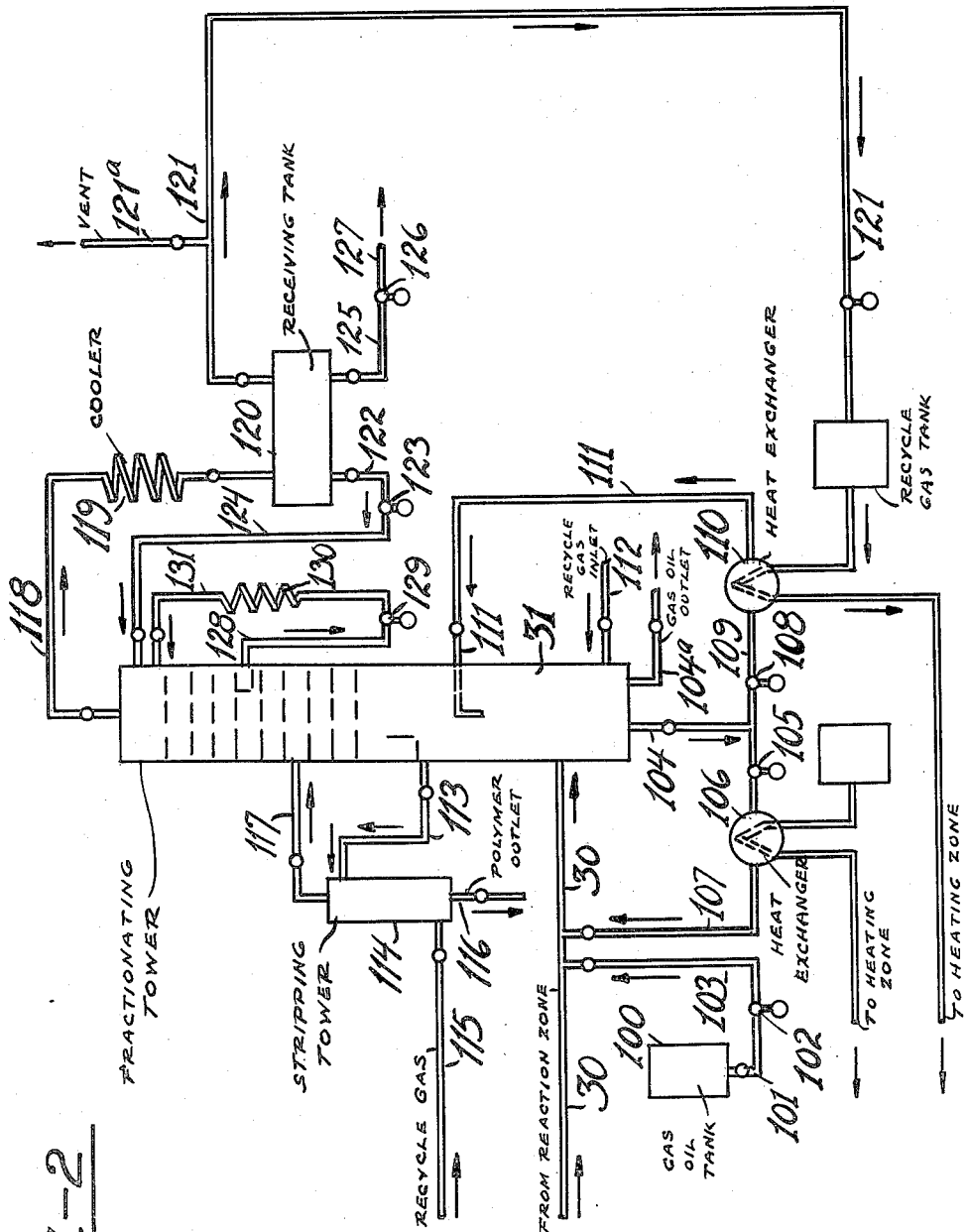

Patented May 9, 1944

2,348,624

UNITED STATES PATENT OFFICE 2,348,624

PROCESS OF CATALYTIC REFORMING

Charles A. Hillman, Maplewood, N. J., assignor, by mesne assignments, to Standard Catalytic Company, a corporation of Delaware Application December 30, 1939, Serial No. 311,829

7 Claims. (Cl. 196—50)

This invention relates to a process of catalytic reforming in the presence of hydrogen and is more particularly concerned with certain improvements in the method of carrying out the process.

The term "catalytic reforming in the presence of hydrogen" wherever used in the specification and claims shall be understood to mean any process in which materials consisting essentially of hydrocarbons substantially boiling in the gasoline range are subjected to heat treatment at a temperature in excess of 500° F., in the presence of a catalyst and in the presence of substantial quantities of added hydrogen or gases rich in free hydrogen in which there is either no net consumption of free hydrogen or there is a net production of free hydrogen, to produce a dehydrogenated or otherwise chemically reconstructed product, for example of anti-knock characteristics superior to those of the starting material, with or without an accompanying change in molecular weight. By the term "chemically reconstructed" is meant something more than the mere removal of impurities or ordinary finishing treatments. The term catalytic reforming in the presence of hydrogen shall be understood to include, but not by way of limitation, reactions such as dehydrogenation, aromatization or cyclization, desulfurization, alkylation and isomerization, all or some of which may occur to a greater or lesser extent during the process.

Catalytic reforming in the presence of hydrogen is ordinarily carried out by passing a mixture of oil vapors and hydrogen through a reaction zone containing a catalyst maintained under a pressure between 50 and 750 pounds per square inch and at a temperature between 850 and 1100° F., at a rate between 0.2 and 5.0 volumes of liquid oil per volume of catalyst per hour, then cooling the products of reaction, separating the gaseous and liquid products, recycling the gaseous products to provide the required gas rich in free hydrogen and recovering a fraction boiling in the motor fuel range from the liquid products. The quantity of gas rich in free hydrogen may be between 1000 and 10,000 cubic feet per barrel of oil, preferably between 4000 and 8000 cubic feet, and this gas should contain between 20 and 90 mol percent of free hydrogen. The flow of oil vapors and hydrogen over the catalyst is continued until (1) the activity of the catalyst as indicated by the octane number of the product produced has fallen off to a point where the desired improvement is not being obtained or (2) there ceases to be a net production of free hydrogen in the process, whichever of these two things occurs first. The catalyst is then subjected to a regeneration treatment which may consist of passing hot inert gases containing regulated quantities of oxygen through the reaction zone whereby the coke and carbonaceous contaminants deposited on the catalyst during the reaction cycle are removed by combustion. Following regeneration the flow of oil and hydrogen is resumed and thereafter reaction cycles and regeneration cycles are alternated for an indefinite period until the catalyst requires replacement.

Characteristic of catalytic reforming in the presence of hydrogen are the facts that (1) the length of time the catalyst can be used in a reaction cycle before it required regeneration is substantially longer than is the case when the reaction is carried out in the absence of hydrogen and (2) the reaction may be carried out under conditions such that there is a net production of free hydrogen therein, so that after once having started up the process it is not necessary to add hydrogen from an extraneous source because the hydrogen initially added and that produced in the reaction may be continuously recycled.

We have found that the continuous recompression of the relatively large volume of recycle gases to reaction pressure, which is preferably between 50 and 750 pounds per square inch, involves the consumption of substantial amounts of power and that it is desirable to reduce the necessity for recompressing the recycle gases to a minimum. Decrease in pressure on these gases occurs principally through pressure drop in various parts of the system, such as heating coils, heat exchangers, cooling coils and the like. In high pressure hydrogenation carried out at pressures of 2000 to 3000 pounds per square inch, pressure drop in the system is not a serious matter because it represents only a fraction of the total pressure, and it is cheaper to increase pressure at high pressures than it is at low pressures. In catalytic reforming in the presence of hydrogen, on the other hand, carried out at pressures between 50 and 750 pounds per square inch, pressure drop in the system may represent a substantial proportion of the total pressure and moreover it involves considerably more expense proportionately to recompress back to reaction pressure.

It is therefore a principal object of the present invention to provide a method of operating a process of catalytic reforming in the presence of hydrogen in which the pressure drop on the recycle gases is kept at a minimum.

The method by which this may be done and the manner in which it is carried out will be fully understood from the following description when read with reference to the accompanying drawings of which Fig. 1 is a semi-diagramatic view in sectional elevation of the entire apparatus and Fig. 2 illustrates in more detail the fractionating equipment.

Referring to Fig. 1, numeral 1 designates a supply tank of oil to be treated. This oil may have been derived from any source and consists essentially of hydrocarbons boiling in the gasoline range, say from 100 to 450° F. Numeral 2 designates a supply tank of hydrogen or gas rich in free hydrogen which may also be obtained from any source but is preferably derived from the process itself after it has once been started up. Pump 3 draws hydrocarbon oil from tank 1 through line 4 and forces it through line 5 into and through a heating coil 6 mounted in a suitable furnace setting 7. Pump 8 draws hydrogen from tank 2 through line 9 and forces it through line 10 into and through a separate heating coil 11 which may be mounted in the same furnace as coil 6 or in a separate furnace. The oil and hydrogen are heated in separate coils 6 and 11 respectively to approximately the same temperature which will ordinarily be between 900 and 1050° F. and approximately 20 to 30° F. above the temperature at which the reaction is to be carried out. Heated oil and hydrogen leave coils 6 and 11 through lines 12 and 13 respectively which converge into line 14. Line 14 carries the mixture of heated oil and hydrogen into the reaction zone in the manner which will be described below.

In the drawings, four reaction zones are shown, these being numbered 15, 16, 17 and 18 respectively. Each of these reaction zones contains a catalytic material designated by the numerals 19, 20, 21 and 22, the nature of which will be more fully disclosed below. The reaction zones are arranged in pairs so that while 15 and 16 are on a reaction cycle, 17 and 18 may be on a regeneration cycle. For the purpose of this description, reaction zones 15 and 16 will be deemed to be on a reaction cycle and reaction zones 17 and 18 on a regeneration cycle. The mixture of hot oil and hydrogen flowing through line 14 is introduced into reaction chamber 15 through line 23. After passing through reaction zone 15, the entire stream of reaction products flows through line 24 into and through a third heating coil 26 which may also be mounted in the same furnace setting 7 or in a separate furnace. After passing through heating coil 26 wherein the products are brought up to a temperature approximately the same as that of the mixture of oil and hydrogen first introduced into reaction zone 15, the reheated products flow through lines 27 and 28 and are then introduced into reaction chamber 16.

Both reaction zones 15 and 16 are maintained under a pressure between slightly above atmospheric pressure and 750 pounds per square inch, preferably under a pressure between 50 and 750 pounds per square inch, and at a temperature between 850 and 1100° F., preferably between 900 and 1000° F. The oil is fed to reaction chamber 15 at a rate between 0.2 and 3.0 volumes of liquid oil per volume of catalyst per hour. The quantity of gas rich in hydrogen is preferably between 1000 and 10,000 cubic feet per barrel of oil and this gas contains between 20 and 90 mol percent of free hydrogen.

The reaction products leave reaction zone 16 through line 30 and pass thence under substantially full reaction pressure and preferably without going through any indirect heat exchange means directly into the bottom portion of a fractionating tower 31. A hydrocarbon oil higher boiling than the feed stock and the products, such as a gas oil, is introduced into line 30 through line 32 and thereby serves to quench the hot reaction products before they enter the fractionating tower 31. A portion of the gas oil and heavier fractions is continuously withdrawn from the bottom of the tower 31 through line 33 by means of pump 34, passed through a cooling means 35 and then returned through line 36 to line 30. In this way the quench gas oil may be recirculated through the bottom portion of the tower to act as cooling medium for the hot reaction products entering the tower through line 30. Fresh gas oil may be continuously introduced through line 32 or it may only be introduced intermittently. Accumulated gas oil and heavy fractions may be removed from the tower through line 33a. The operation of the fractionating tower will be explained in more detail below in connection with the description of Fig. 2.

The bottom portion of fractionating tower 31 is maintained at a temperature between 600 and 800° F. and the upper portion of the tower at a temperature between about 250 and 450° F. depending upon the boiling range of the reformed products, the temperature and quantity of the quenching oil and other factors. A polymer fraction which is too high boiling for the desired product is removed from the middle portion of the tower through line 37 and collected in a tank 38. The entire tower is maintained under a pressure substantially equal to that maintained in the reaction zones 15 and 16.

Those products of reaction which are still in vapor form are removed from fractionating tower 31 through line 39, pass thence through a cooling means 40 and discharge into a separating zone 41 wherein gaseous products are separated from condensed products. The condensed products are removed from separator 41 through line 42 and introduced thence into a pressure stabilizing tower 43 wherefrom constituents too volatile for the desired product are removed through line 44 and passed to a gas absorption system or otherwise disposed of. The stabilized product is removed from tower 43 through line 45 and collected in tank 46.

Returning to the separator 41, the gaseous products which are still under high pressure but somewhat lower than reaction pressure are removed through line 47, recompressed to reaction pressure by means of compressor 48 and then returned to hydrogen supply tank 2 through line 49. Gas may be vented from time to time through line 50. This may be done when too much gas is being produced in the process or when it is desired to avoid decreasing the concentration of hydrogen in the entire quantity of recycle gas. This latter may occur for example if the rate at which hydrocarbons such as methane, ethane and propane are formed in the reaction exceeds the rate at which hydrogen is being produced, or if the net production of free hydrogen in the reaction falls off.

It will be noted that by operating in the manner above described, the recycle gases pass through only two pieces of apparatus in which appreciable pressure drop may occur. These are the heating coil 11 and the cooling coil 40. By heating the gas rich in hydrogen in a separate coil instead of heating it in the same coil with the oil, pressure drop on the gas is held to a minimum. Similarly, by passing the reaction products into the tower 31 without any reduction of pressure and without passage through any indirect heat exchange means, the opportunities for pressure drop are still further minimized. In short, the entire process is conducted under conditions such that the opportunity for pressure drop on the recycle gases is eliminated in so far as possible.

For purposes of description, it will be assumed that the catalyst in reaction zones 17 and 18 has already been used in a reaction cycle and now requires regeneration to restore its activity. Numeral 60 designates a flue gas heater or combustion chamber in which a substantial quantity of hot inert flue gas is generated. Fuel gas such as refinery gas or natural gas is introduced into the flue gas heater through line 61. Air is supplied through line 62 to an air compressor 63 and air compressed to a pressure of 100 to 150 pounds is forced through line 64 and introduced into the flue gas heater through line 65. The mixture of air and fuel gas undergoes combustion in the flue gas heater 60 and hot flue gases at a temperature between 650 and 1200° F. leave the flue gas heater through line 66 and are introduced into reaction zone 17 through lines 67 and 68 and enter reaction zone 18 through lines 69 and 70. It will be understood that suitable storage tanks may be provided in order to maintain an adequate supply of flue gas. The quantity of air supplied to the flue gas heater through lines 64 and 65 may be regulated so that the hot gases entering the reaction zones 17 and 18 contain the proper quantity of oxygen which is preferably between 0.3 and 10%. The quantity of oxygen in these gases is regulated so that the maximum temperature in reaction zones 17 and 18 will not rise appreciably above 1200° F. because temperatures in excess of this appear to affect adversely the structure and activity of the catalyst. The passage of the hot flue gases containing regulated quantities of oxygen through the catalyst mass in reaction zones 17 and 18 causes combustion of the coke and other carbonaceous materials deposited on the catalyst. The hot combustion gases leave reaction zones 17 and 18 through lines 71 and 72 respectively and are carried thence through line 73 into a waste heat boiler 75. Water is introduced into the waste heater boiler through line 76 and steam is removed therefrom through line 77. The hot gases after being partially cooled in the waste heat boiler 75 pass thence through line 78 and are returned to the flue gas heater 60 by means of a gas blower 79. Additional air may be introduced as required through line 64. A portion of the gases may be vented from time to time through line 80. It will be understood that the flue gases may be continuously recirculated and that fresh fuel gas need be introduced into the flue gas heater only when starting up or when additional heat is required.

The quantity of gas containing oxygen which is passed through the reaction zones 17 and 18 is preferably between 1000 and 3000 volumes per volume of catalyst per hour. The passage of these hot gases through the reaction zones is continued until there ceases to be a consumption of oxygen from the gases, this point indicating that substantially no more combustible material remains on the catalyst. The time required for complete regeneration will depend primarily upon the quantity of coke which has been deposited on the catalyst during the preceding reaction cycle. By conducting the regeneration under pressure between 100 and 150 pounds per square inch, however, the time required for regeneration may be substantially reduced over that which would be required if regeneration were carried out at atmospheric pressure. Smaller concentrations of oxygen may be used when regenerating under pressure and as a result a larger percentage of inert gas will be available for absorbing the heat of combustion during regeneration.

Following regeneration, the reaction zones 17 and 18 may be operated on a reaction cycle and the catalyst in reaction zones 15 and 16 may be regenerated. The flow of hot oil and hydrogen through reaction zones 17 and 18 will be substantially the same as that through reaction zones 15 and 16 and likewise the flow of regenerating gases through reaction zones 15 and 16 will be the same as that through reaction zones 17 and 18. For simplicity in description and illustration, these additional lines of flow have not been shown but it will be understood that they are merely duplicates of the lines of flow actually shown.

Referring to Fig. 2 which illustrates the fractionating equipment in more detail and shows the lines of flow therethrough, numeral 31 designates the fractionating tower and numeral 30 designates the line carrying hot reaction products from the reaction zone into the tower. Numeral 100 designates a supply of gas oil. This oil is withdrawn from tank 100 through line 101 by means of pump 102 and forced through line 103 into line 30 wherein it contacts the hot reaction products and partially cools the same by quenching. A portion of the heavier oil is continuously withdrawn from the bottom of tower 31 through line 104 by means of pump 105, passed through a heat exchange means 106 and then returned to line 30 through line 107. The products withdrawn from the bottom of the tower may be partially cooled by indirect heat exchange with fresh feed or with recycle gas. Another portion of the heavier oil withdrawn from the bottom of tower 31 through line 104 may be forced by means of pump 108 through line 109 into and through a heat exchange means 110 and then returned to the tower through line 111 so that it may serve as reflux in the bottom portion of the tower. Stripping of the hot products in the bottom portion of the tower may be effected by introducing a gas, conveniently a portion of the recycle gas, thereinto through line 112. The partial cooling of the heavier products recirculated through line 111 to act as reflux may be accomplished by heat exchange with the fresh feed or the recycle gas or both. Accumulated gas oil and heavy fractions may be removed from the tower from time to time through line 104a.

A side stream is withdrawn from the middle portion of the tower through line 113 and introduced into a stripping tower 114. A portion of the recycle gas may be introduced into the stripping tower through line 115 in order to strip out the lighter fractions. A heavy polymer fraction which constitutes hydrocarbons too high boiling for the desired product is removed from the stripping tower through line 116. The gas and lighter fractions are removed from the stripping tower through line 117 and returned to the main fractionating tower 31.

Hydrocarbon vapors and gas are removed from tower 31 through line 118, passed through a cooling means 119 and then collected in a tank 120. The uncondensed fractions are removed from tank 120 through line 121 and returned to the recycle gas supply tank. A vent line 121a is provided through which a portion of the gas may be removed from the system when and if necessary. A portion of the condensate collected in tank 120 is continuously removed therefrom through line 122 and forced by means of pump 123 through line 124 into the top of tower 31 to act as reflux. The remainder of the condensate in tank 120 is withdrawn therefrom through line 125 by means of pump 126 and then passed through line 127 to a stabilizing means.

A side stream is removed from the upper portion of tower 31 through line 128 by means of pump 129, passed through a cooling means 130 and then reintroduced into the top of the tower through line 131 to serve as additional reflux.

It will be seen that in the lower portion of the tower, gas oil and heavier fractions are used as reflux and in the upper portion of the tower, portions of the condensed product are used as reflux. It will be understood that wherever cooling is necessary, this may be accomplished by indirect heat exchange with fresh feed stock or recycle gas or both.

The catalyst used in the process may be selected from a wide variety of different materials. The preferred catalysts, however, are oxides or sulfides of metals of the IV, V, VI and VIII groups of the periodic system, preferably in combination with carriers such as activated alumina, alumina gels, peptized alumina gels, silica gels, silica-alumina gels, silica magnesia gels, bauxite and the like. Preliminary treatment of the carrier with hydrofluoric or fluosilicic acid is frequently advantageous to increase the adsorptive capacity of the carrier. Particularly suitable catalysts comprise alumina and from 1 to 50% by weight of oxides of molybdenum, chromium, tungsten, vanadium, cobalt and nickel. The catalysts may be prepared in any of several different ways. For example, they may be prepared by mechanical mixing of the several ingredients, by impregnating the carrier with a solution of the metal compound and then heating to convert the metal compound to its oxide or by co-precipitating the carrier and the metal compound from a solution containing the two and thereafter heating and drying the precipitated mass. The catalyst is used in the form of small lumps, pills, tablets, pellets or granules of regular or irregular shape which are preferably of small dimension, say less than 10 mm. in diameter.

In the operation of the process it will be understood that any suitable cooling medium may be used to reduce by direct heat exchange the temperature of the hot products leaving the reaction zone. In general any hydrocarbon oil which is higher boiling than the hydrocarbon constituents of the products is suitable. Gas oils, light lubricating oils or heavy kerosenes are particularly efficacious. It will also be understood that the cooling medium which is recirculated through the bottom portion of the tower is continuously cooled to remove the heat absorbed from the hot reaction products and that the quantity of cooling medium recirculated may be regulated so that sufficient heat will be absorbed from the hot products to reduce their temperature substantially, say from above 900° F. to below about 750° F. The cooling of the recirculated cooling medium may be effected conveniently by heat exchange with the naphtha feed or the recycle gas or both. Heat exchange between hot products and entering oil may be effected at other stages of the process in accordance with customary procedure.

It is ordinarily not necessary to scrub the recycle gases prior to their return to the system because the hydrogen concentration may be maintained above about 20 mol percent without doing so. However, scrubbing is not precluded if it should be found necessary or desirable to maintain a hydrogen concentration higher than that which can be maintained normally. Should scrubbing be necessary this may be done without substantial reduction of pressure by passing all or a portion of the gases through a tower in countercurrent to a stream of scrubbing oil such as a naphtha, gas oil or any other liquid medium capable of selectively absorbing hydrocarbon constituents.

In starting up the process, it may be necessary to supply a gas rich in free hydrogen from an extraneous source. Once the process is in operation, however, the same gases may be recycled continuously. If a gas rich in free hydrogen is not readily available, it may be obtained very easily by operating the reforming reaction for a few hours at a low pressure, say 20 to 50 pounds per square inch. Under these conditions a substantial quantity of free hydrogen is produced but the quality of the liquid product is not as desirable as that obtained at higher pressures. When sufficient gas rich in free hydrogen has been so produced, the pressure may be gradually increased to the desired reaction pressure without any interruption in operation. After shutting down for regeneration or other purposes, the gases remaining in the system may be kept in storage and used for starting up again.

The following example illustrates the application of the process to a specific feed stock:

A heavy naphtha derived from an East Texas crude is passed through a heating coil under a pressure of about 340 pounds per square inch and heated to a temperature of about 980° F. A gas rich in free hydrogen is passed through a separate heating coil under a pressure of about 245 pounds per square inch and heated to a temperature of about 980° F. The heated oil and hydrogen are mixed and then introduced into a first reaction zone containing lumps of a catalytic material comprising activated alumina impregnated with about 8% of molybdenum oxide. After passage through the reaction zone, the temperature has dropped to about 900° F. The reaction products are then passed through another heating coil in which they are brought back to a temperature of about 1025° F. and introduced into a second reaction zone substantially similar to the first. The entire stream of reaction products from the second reaction zone is introduced directly into the bottom of a fractionating tower. A stream of gas oil at a temperature between about 425 and 550° F. is introduced directly into the stream of hot reaction products entering the fractionating tower and the reaction products are thereby partially cooled to a temperature between about 600 and 800° F. The pressure prevailing in the fractionating tower is about 250 pounds per square inch. Those products remaining vaporized are removed from the fractionating tower and passed through a cooler wherein they are cooled to a temperature of about 100° F. and then introduced into a separating zone. The pressure at this point has dropped to about 185 pounds per square inch. The gaseous products are removed from the separating zone and recompressed to a pressure of about 245 pounds per square inch and then recycled through the heating coil and the reaction zones. The liquid products are removed, passed through a pressure stabilizer and a fraction boiling in the motor fuel range is recovered therefrom.

The flow of oil and hydrogen through the reaction zones is continued for a period of about 6 hours and then the catalyst in the reaction zones is regenerated in the manner described above. Sufficient hydrogen is produced in the reaction so that the concentration of hydrogen in the recycle gases is maintained between 40 and 60 mol percent.

This invention is not limited by any theories of the mechanism of the reactions nor by any details which have been given merely for purposes of illustration, but is limited only in and by the following claims in which it is intended to claim all novelty inherent in the invention.

I claim:

1. An improved process of catalytic reforming in the presence of hydrogen carried out under conditions such that there is a net production of free hydrogen therein which comprises heating the oil and a gas rich in free hydrogen in separate heating means to a temperature somewhat above reaction temperature while under a pressure somewhat above reaction pressure, mixing the heated oil and gas rich in free hydrogen, passing the mixture through a reaction zone containing a catalyst which promotes reforming and maintained at a temperature between 900 and 1000° F. and under a pressure between 50 and 750 pounds per square inch, removing the products from the reaction zone, cooling said products to a substantially lower temperature by admixture with a hydrocarbon oil higher boiling than the feed oil and the products introducing said mixture directly into a fractionating means, fractionating said products under substantially the same pressure as that maintained in the reaction zone, removing vapors from the fractionating means, cooling said vapors to condense a portion thereof, separating the condensate from the remaining gases, recycling the gases to the gas heating means and recovering a fraction boiling in the motor fuel range from the condensate.

2. An improved process of catalytic reforming in the presence of hydrogen carried out under conditions such that there is a net production of free hydrogen therein which comprises heating the oil and hydrogen in separate heating means to a temperature somewhat above reaction temperature while under a pressure somewhat above reaction pressure, passing the mixture of the heated oil and hydrogen through a first reaction zone containing a catalyst which promotes reforming, removing the products of reaction from said first reaction zone, passing them through a heating means to bring their temperature back substantially to the initial reaction temperature, passing the reheated products through a second reaction zone substantially similar to the first, maintaining both reaction zones at a temperature between 900 and 1000° F. and under a pressure between 50 and 300 pounds per square inch, removing the products from the second reaction zone, introducing directly thereinto a quantity of a hydrocarbon oil higher boiling than the feed oil and the products sufficient to cool said reaction products to a substantially lower temperature, passing the partially cooled products into a fractionating means maintained under substantially the same pressure as the two reaction zones, removing uncondensed products from said fractionating means, cooling said products, separating the condensed from the uncondensed products, recycling the uncondensed products to the separate gas heating means for the first reaction zone and recovering a fraction boiling in the gasoline range from the condensed products.

3. An improved process for catalytic reforming in the presence of hydrogen carried out under conditions such that there is a net production of free hydrogen therein which comprises heating a naphtha to a temperature between 850 and 1100° F. at an initial pressure between slightly above atmospheric pressure and 800 pounds per square inch, heating in a separate heating means a gas rich in free hydrogen to a temperature between 850 and 1100° F. at an initial pressure between slightly above atmospheric pressure and 750 pounds per square inch, mixing the heated oil and gas rich in free hydrogen, passing the mixture through a first reaction zone containing a catalyst at a rate between 0.3 and 4.0 volumes of liquid naphtha per volume of catalyst per hour, removing the products from the first reaction zone, passing them through a heating means to bring their temperature back to between 950 and 1000° F., passing the reheated products into a second reaction zone containing a catalyst, removing the products from the second reaction zone, introducing said products directly into the bottom portion of a fractionating tower wherein said products are cooled to a temperature between 600 and 800° F. by direct contact with a cooler gas oil, fractionating said products under substantially full reaction pressure, removing uncondensed products from the upper portion of the fractionating tower, cooling said uncondensed products to a temperature between 100 and 125° F., whereby a portion thereof is condensed, removing the condensed portion, increasing the pressure on the uncondensed products to between 200 and 250 pounds per square inch and recycling them to the hydrogen heating means in place of fresh gas rich in free hydrogen.

4. Process according to claim 2 in which the quantity of hydrocarbon oil higher boiling than the feed oil and the products which is introduced directly into the products from the second reaction zone is sufficient to cool said products to a temperature between 600 and 800° F.

5. In a process of catalytic reforming in the presence of hydrogen carried out under conditions such that there is a net production of free hydrogen therein, and in which the normally gaseous products of reaction are continuously recycled to provide the hydrogen required, the improvements which comprise heating the oil and hydrogen-containing gas in separate heating means prior to their introduction into the reaction zone, passing the entire stream of products leaving the reaction zone directly into a fractionating means, maintaining said fractionating means under substantially the same pressure as the reaction zone, and cooling the products leaving said reaction zone by direct heat exchange with a cooler hydrocarbon oil having a higher boiling point than any of the constituents of said products immediately prior to their introduction into said fractionating means.

6. In a process of catalytic reforming in the presence of hydrogen carried out under conditions such that there is a net production of free hydrogen therein, and in which the normally gaseous products of reaction are continuously recycled to provide the hydrogen required, the improvements which comprise heating the oil and hydrogen-containing gas in separate heating means prior to their introduction into the reaction zone, passing the entire stream of products leaving the reaction zone directly into a fractionating means, maintaining said fractionating means under substantially the same pressure as the reaction zone, and cooling the products leaving said reaction zone immediately prior to their introduction into said fractionating means to a temperature substantially below reaction temperature by direct heat exchange with a cooler liquid medium having a higher boiling point than any of the constituents of said products.

7. In a process of catalytic reforming in the presence of hydrogen carried out under conditions such that there is a net production of free hydrogen therein, and in which the normally gaseous products of reaction are continuously recycled to provide the hydrogen required, the improvements which comprise heating the oil and hydrogen-containing gas in separate heating means prior to their introduction into the reaction zone, passing the entire stream of products leaving the reaction zone directly into a fractionating means, maintaining said fractionating means under substantially the same pressure as the reaction zone, and cooling the products leaving said reaction zone immediately prior to their introduction into said fractionating means by direct heat exchange with a cooler gas oil.

CHARLES A. HILLMAN.